March 30, 1965            T. WYATT            3,176,288
SYSTEM FOR EXTENDING THE RANGE OF A SEARCH RADAR
Filed Aug. 29, 1957            4 Sheets-Sheet 1
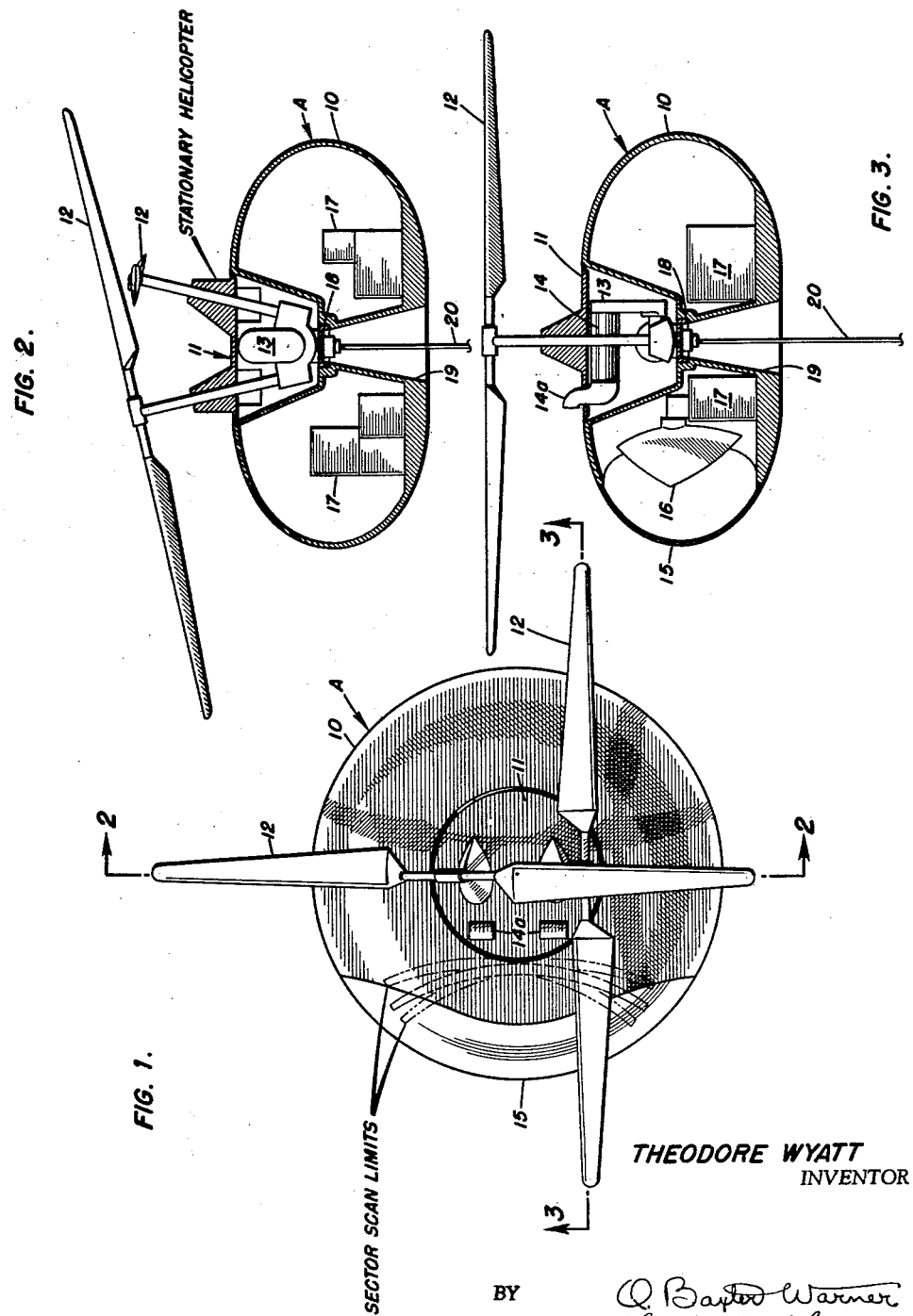
THEODORE WYATT
INVENTOR
BY Q. Baxter Warner
Claude Funkhouser
ATTORNEYS

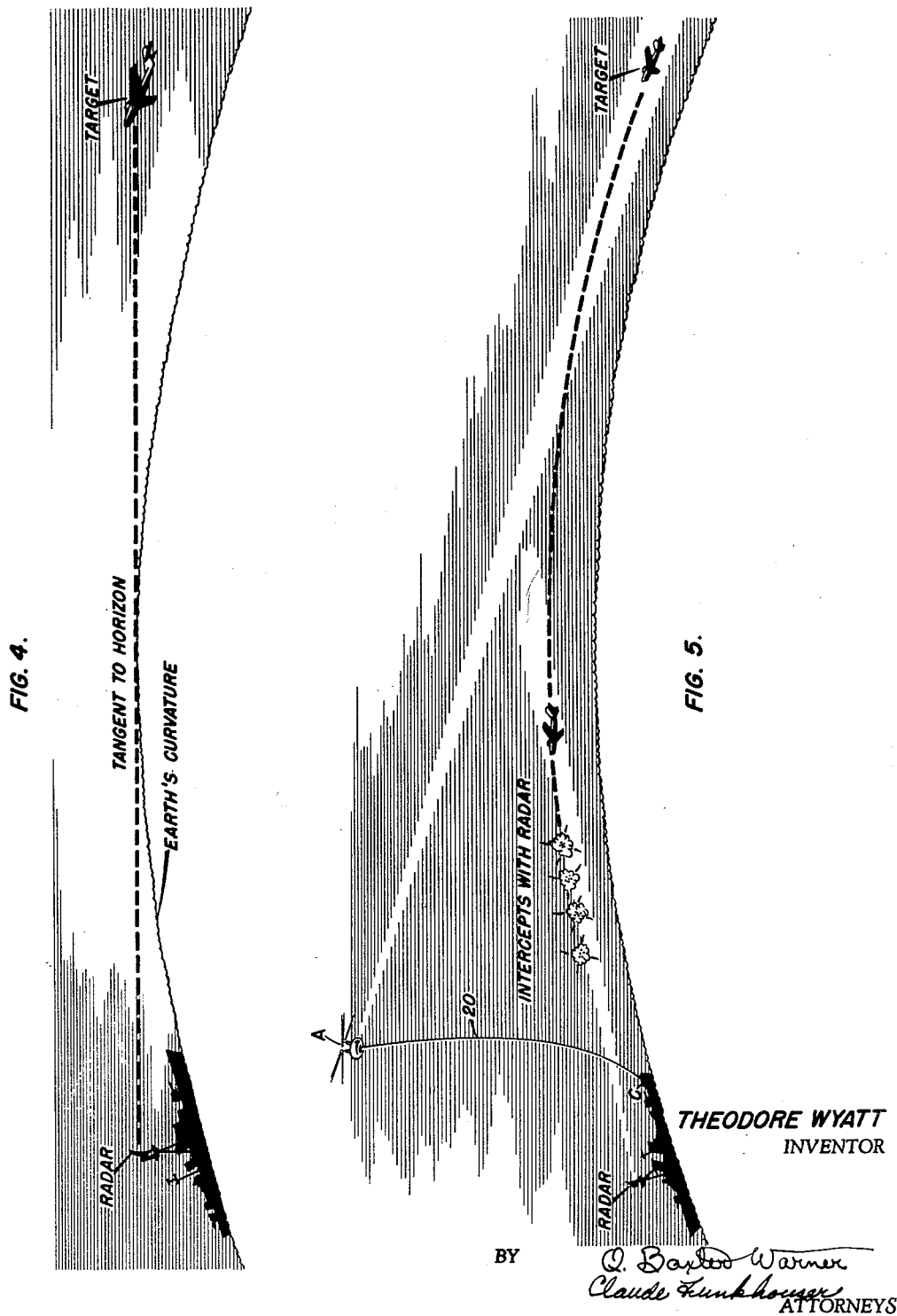

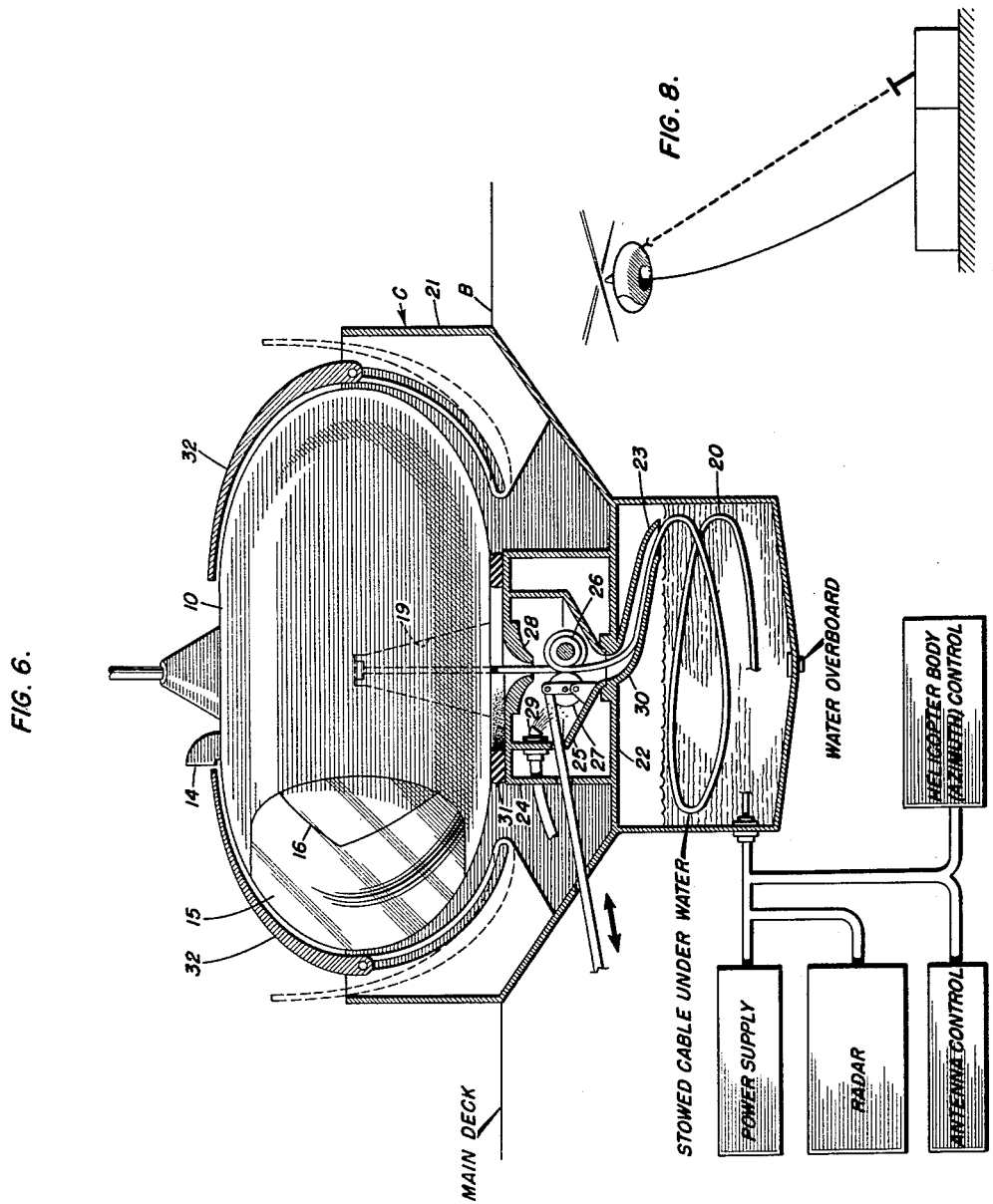

United States Patent Office 3,176,288
Patented Mar. 30, 1965

3,176,288
SYSTEM FOR EXTENDING THE RANGE OF A SEARCH RADAR
Theodore Wyatt, Silver Spring, Md., assignor to the United States of America as represented by the Secretary of the Navy
Filed Aug. 29, 1957, Ser. No. 681,148
10 Claims. (Cl. 343—5)

The present invention relates to an improved radar antenna system. More particularly, it relates to a system and apparatus for extending the range of land-based or shipboard radar guided missile systems.

Critical gaps exist in the capabilities of guided missile systems in terms of current offensive tactics and of known developments capable of employment in the not too distant future. It is generally agreed that attacks by low flying aircraft cannot be countered adequately by presently conceived systems and that an intelligent enemy can be expected to take maximum advantage of this weakness. Specifically, the horizon limitation, imposed by standard radar antenna systems, precludes target detection at appreciable ranges and thereby drastically curtails engagement time, thus clearly reducing the number of enemy aircraft that a given missile system can engage prior to the release of bombs or missiles by such aircraft.

One of the principal objects of the present invention, therefore, is to provide an improved radar antenna system which contemplates elevating a search radar antenna to an altitude such that the radar range is extended, i.e., so that its horizon is compatible with the target intercept time and with the range of the fire control radar, to the end that the defending forces will have time to recognize the target, decide that it is hostile, decide to engage it and train a weapon system on it.

A further object of the invention is to provide a radar antenna system which will be compatible with guided missile specifications, including all-weather operating characteristics such as high winds and icing conditions.

Another object resides in the provision of a radar antenna system which will be suitable for operation in conjunction with guided missile ships while operating either as a part of a task force or independently of other naval vessels. It is indeed an object to provide a system that will perform one of the functions of aircraft and aircraft carriers, thereby compensating for their absence in some types of naval actions or reducing the demands placed on them when present.

As still another object, the invention provides an antenna system which is capable of operating for extended periods, its operation unlimited by such factors as personnel fatigue and limited fuel capacity.

And a still further object is to provide a radar antenna system which will be relatively inexpensive in that it will not require substantial modifications to the radar installations with which it is to be used, or extensive re-training of operating personnel.

Another object of the invention resides in the provision of means for extending the range of a search radar, which means contemplates the use of a robot helicopter powered and controlled through a tether cable which connects said helicopter to a ground based station or a shipboard radar installation. A feature of the invention is a simplified means of automatic flight control.

And a further object of the invention is to provide an improved radar antenna system, utilizing a helicopter for elevating the antenna employed, which is capable of searching a full 360° of target area.

Other objects and many of the attendant advantages of the present invention will be readily appreciated as the same becomes better understood by reference to the following detailed description when considered in connection with the accompanying drawings, wherein:

FIG. 1 is a top plan view of a helicopter antenna mount for use with the improved radar antenna system;

FIG. 2 is a vertical section of the helicopter, on the line 2—2 of FIG. 1;

FIG. 3 is a vertical section, on the line 3—3 of FIG. 1;

FIG. 4 is a schematic representation of a conventional shipboard radar installation detecting a target;

FIG. 5 is a schematic view showing the shipboard radar installation, employing the radar antenna system of the present invention in operation detecting a target over the horizon;

FIG. 6 is an enlarged sectional view, partly in elevation, showing a tethered helicopter nested in a shipboard mount prior to elevation;

FIG. 8 is a diagrammatic representation showing the helicopter connected to ground radar components by a radio link.

Figure 7:
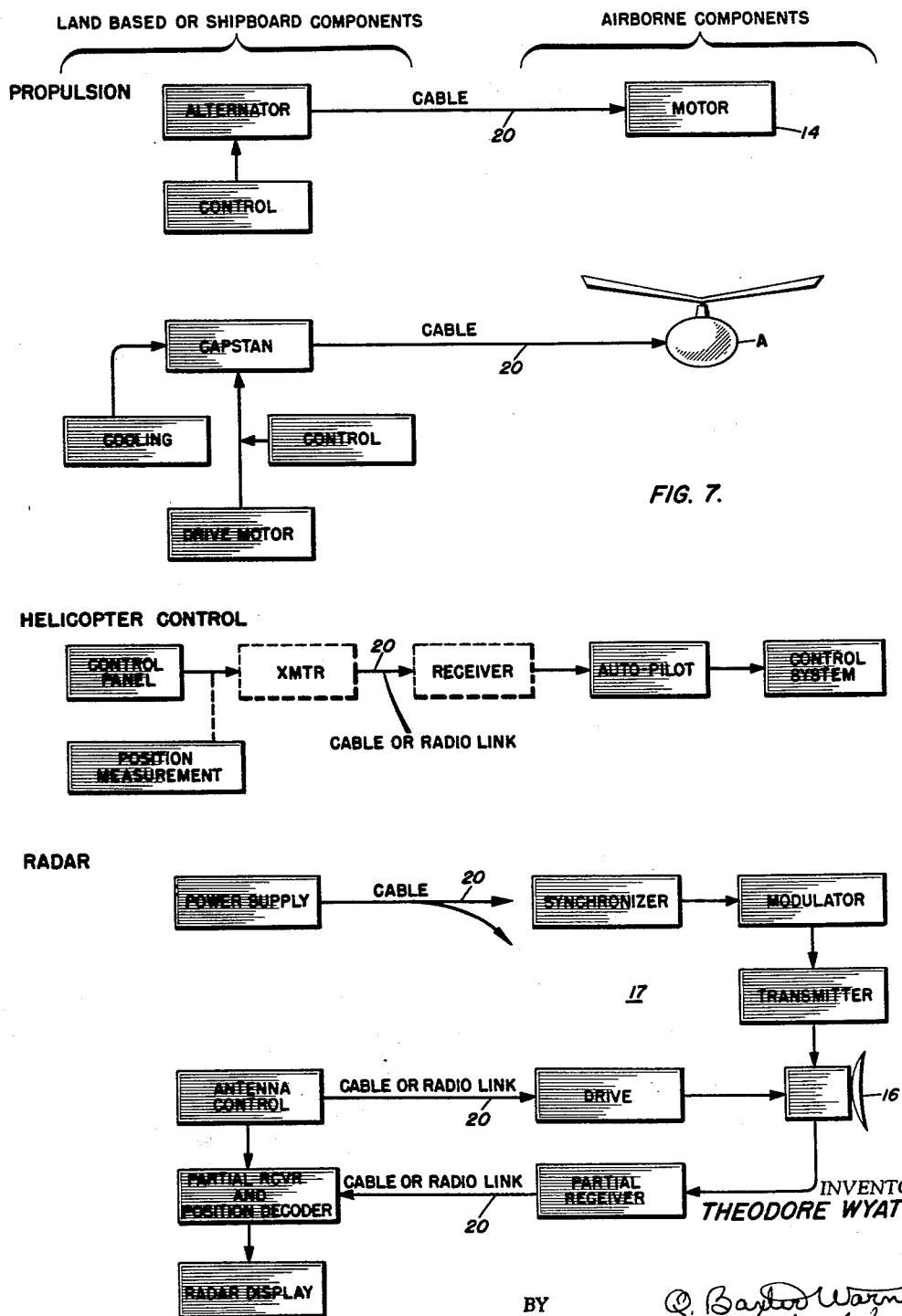
FIG. 7 is a block diagram showing the improved radar antenna system according to the present invention, and particularly illustrating the components which are located on the ground or on shipboard and those which will be positioned in the tethered helicopter.

Briefly, the present invention contemplates a remotely powered and controlled tethered helicopter which is elevated by a conventional helicopter blade or propeller system driven through a known type transmission. An electric motor, driving through the transmission, provides power for the blades. The helicopter body contains an antenna which is presented toward a radome carried in the wall of the body. The entire body may be rotated with respect to the motor and its transmission, whereby the antenna may be caused to sweep 360°. Portions of the radar transmitter and receiver are carried within the body of the helicopter and other portions or components are positioned in the ground station or on shipboard, connections between the helicopter components and those on the ground or shipboard being maintained through the cable which also serves to tether the helicopter above the ground radar station or ship. It should be understood, however, that some data and control functions can be transmitted up to the helicopter or down to the ground or ship base by the cable or by radio link. The choice can be made to suit the specific design and application.

The fundamental problem in detecting low altitude targets by search radars is the line-of-sight nature of the propogation of microwave radiation. As illustrated in FIG. 4, because of the curvature of the earth's surface, the range at which a target can be observed is a function of the elevation of both the observer and the target. For example, if a radar antenna is placed at an elevation of 80 ft., the usual maximum feasible height aboard ship, there results a blind range for targets flying at 50 ft. altitude of about 40,000 yards. At a range of 100,000 yards targets flying as high as about 1,000 ft. are below the minimum line-of-sight and consequently are undetectable. As a result, targets can approach to within a sufficiently close range to execute an attack before any guided missiles can intercept them or before more than one or two intercepts can be made, depending upon such variables as target velocities, target weapon release range, and missile weapon system delay times.

By elevating the radar antenna a distance of a thousand feet or more above the land-based radar station or above a shipboard radar installation, as shown in FIG. 5, it will be possible to extend the range at which a target may be detected, with the result that a target intercept may be accomplished before the target aircraft approaches within lethal range.

Referring to the drawings, and first to FIGS. 1, 2 and 3 thereof, the helicopter of the present invention is shown at A. The helicopter A includes a body 10 which is of toroidal configuration and is mounted for rotation about a stationary center section 11 which carries intermeshing rotor blades 12, a transmission 13 and a driving motor 14. Cooling ducts for the motor are shown at 14a. The body 10 carries a radome 15 in its side wall. Within the body and confronting the radome is a radar antenna 16 comprising a dish and other antenna elements, the latter not shown. Radar components in addition to the antenna, and shown in block diagram in FIG. 7, are illustrated schematically at 17. As best seen in FIGS. 2 and 3, the body is coupled to the stationary center section by a bearing 18 which is located amidships and above a generally frusto-conical throat 19. A cable 20 transmits power and control commands to the motor 14 and body 10 and electrically couples radar components in the body with associated components at the ground station or on shipboard. The cable 20 extends through the threat 19 to the motor 14, and suitable connections through slip rings or other devices (not shown) extend from the cable to the radar components 17 in the body 10.

In order to keep the size of the cable 20 as small as possible so as to minimize the cable aerodynamic forces ad to keep the weight of the cable at a miniumum, the current passed through the conductors thereof is higher than usual practice dictates, causing said cable to operate at a temperature just safely below the limit of high temperature insulating materials. The elevated temperature of the cable precludes ice formation, but, as discussed below, requires the provision of cooling means when it is confined or stored in a manner preventing atmospheric cooling.

In FIG. 6 there is shown an example of a suitable tether station for the helicopter A. The example shown is a shipboard installation, the deck of the ship being designated at B and the station generally at C. The tether station C is best located in a cleared area, such as on the fantail of the ship, and includes a circular receptacle 21 comprising a side wall which has a straight upper portion, an inclined lower portion and a bottom wall 22. Positioned below the bottom wall 22 is a cable stowage tank 23. Above the wall 22 there is located a housing 24 which encases a chamber 25 enclosing a powered capstan 26 and idler 27, a cable hawse 28 being positioned in the top wall of the housing 24. Power for the capstan 26 may be supplied by a motor (not shown). An inlet nozzle 29 connected to a source of water, is mounted on the side wall of the chamber 25 and extends through the side wall of the housing 24. Water flow is provided for cooling the cable 20, which would otherwise become overheated in the tank 23. An alternative design might incorporate a conventional cable drum and water sprays. For leading the cable 20 into the tank 23 there is provided a guide tube 30. A shock absorber ring 31 overlies the top wall of the housing 24 for cushioning the helicopter when in position in the tether station C. "Clam shell" doors 32 are mounted on the side wall of the receptacle 21 and are movable from the broken line positions to the positions shown in full lines, for protecting the helicopter body when in tethered position from heavy seas or from accidental blows from other objects on the ship.

With the helicopter in tethered position the cable 20 extends through the hawse 28, about the powered capstan 26, through the guide tube 30 and into the stowage tank 23. An end portion of the cable is passed through a suitable gland in the side wall of the tank and connected to a power source (not shown) and to ship borne radar components, indicated in FIG. 7. By the use of the capstan 26, the tank 23 and associated structure it is possible to insure proper cooling and storage of the cable 20 to prevent failure thereof from excessive temperatures. Moreover, the cable stowage arrangement eliminates the use of slip rings for transferring power at the tether station, and no level wind mechanism, which would be required with a winch drum, is needed. The idler 27 is adjustable and is employed as a constant tension brake for maintaining the cable 20 under a desired amount of tension at all times.

In FIG. 7 there is shown, in block diagram, the arrangement of components installed in the tether station and those in the helicopter, legends largely being used to designate said components. Since the components, individually, are of known design, detailed descriptions are believed unnecessary. It will be observed that the legend "cable" is used for designating the connections between the components of the various groups, such as "propulsion," "radar," etc., at the tether station and the helicopter or the associated component groups in the helicopter. It should be understood that but one cable, i.e., the cable 20, is used, suitable conductors for each function being built therein. If the functions are communicated by the cable, rather than by radio, a preferred method would be to employ known carrier frequency techniques and to communicate the functions on the main power conductors, rather than to provide additional conductors for that sole purpose.

In operation, prior to elevation of the helicopter from the tether station C, assuming shipboard operation, the "clam shell" doors 32 are retracted and the rotor blades 12 attached (in event of their prior removal for storage). Power is then applied, through the cable 20, to the motor 14 for rotating the blades. After the motor has been brought up to speed the helicopter will exert full lift on the cable 20, against the restraining effort exerted by the idler 27 under control of the operating personnel. As the restraint is released the helicopter will rise above the ship at a rate under the control of the operating personnel, and as sufficient cable is payed out to permit its altitude to increase, the helicopter will cease to respond to any ship motion and will assume a steady attitude as dictated by the autopilot (FIG. 7). The helicopter would continue to climb until the cable is braked at the capstan at the desired altitude, say 1000 or 2500 feet. During elevation of the helicopter the radar equipment therein and on the ship would be placed in operation. At night or during periods of limited visibility the helicopter could be tracked automatically by known means and its position changed by the operator. Effective lighting means would be used, when feasible, to reduce navigational hazards to friendly aircraft.

Landing of the helicopter may be accomplished by applying power to the capstan and winding in the cable 20 while maintaining said helicopter under full power and stabilization. When fully lowered the helicopter will rest on the shock absorber ring 31, when the blades may be braked to a stop and the power disconnected.

When in elevated position the helicopter would as stated hereinabove, be controllable for permitting rotation of the body 10 about the center section 11, thus permitting 360 degree scanning (in azimuth) of the radar antenna 16. As seen in broken lines in FIG. 1, sector scanning, within narrow limits, may be effected by holding the body at the desired heading and oscillating the antenna within the radome 15, by suitable control signals from the ship via the cable 20.

Automatic flight control of the helicopter may be effected as a means of reducing the personnel required for its operation and as a means of insuring control under conditions of reduced visibility, and to accomplish this a fully automatic control system has been adopted from existing art. The system consists of an autopilot employing an altimeter and gyroscopic references and of positional measurements in a generally horizontal plane derived from a rigid section at the top of the cable 20, FIGS. 2 and 3. By holding the central portion 11 of the helicopter vertical by the autopilot control system and by measuring the cable position and by maneuvering the helicopter automatically in the horizontal plane so as to keep the rigid segment of the cable also vertical or at any other selected reference angle, the position of the helicopter in the three coordinates of space is rigorously defined for a given condition of wind. It follows that a preferred overhead location of the helicopter can be selected, having a knowledge of the wind, by remote selection of the above-mentioned reference angle.

To minimize cable weight and diameter the radio link shown in FIG. 8 may be used between the helicopter and the tether station. With a radio link only power for the helicopter motor and for rotating the body about the center section would have to be carried by the cable 20.

A natural phenomenon known as "ducting" commonly arises in microwave propagation due to the presence of a temperature inversion layer in the lower portion of the atmosphere. The ducting layer has the effect of impairing or preventing radar transmission or reception through the layer. Consequently, an object well above the horizon, but on the other side of the ducting layer, may be undetectable by radar, even though visible to the eye. Therefore, an added application suggested for this invention is to employ the helicopter to perform a survey of the atmosphere with a known refractive index measuring instrument so as to determine the existence of a ducting condition and also to observe the targets above the ducting layer which a surface-based radar could not detect. An additional helicopter immediately below the ducting layer (that is, in the ducting area) could be used, at the same time, to detect targets approaching between said layer and the surface of the ground (or sea).

The present invention will also be useful in partially nullifying countermeasures against radar. This capability derives from its ability to detect and locate in azimuth jammers, by the use of a conventional radar installation employing an ECM (electronic countermeasures) intercept receiver supplemented by a like arrangement in a surface installation. The vertical displacement of an ECM intercept receiver in the helicopter would provide a base line which would permit an estimation of the jammer's range by triangulation. Since one of the problems typically produced by jammers is denial of range information, triangulation can be accomplished by horizontal displacement between receivers but this technique is obviously difficult to accomplish at sea since the receivers would have to be located on separate ships. On land the helicopter triangulation technique would provide the convenience of having both receivers located at the same ground site, even though horizontal displacement would be fairly practical.

As will be obvious, the antenna system of the present invention may be used as a microwave relay station, if desired.

Obviously many modifications and variations of the present invention are possible in the light of the above teachings. It is therefore to be understood that within the scope of the appended claims the invention may be practiced otherwise than as specifically described.

What is claimed is:

1. A radar system including, in combination, a helicopter comprising a body and a center section, lift producing means on the center section, the body being rotatable about the center section and having a radome thereon, an antenna in the body and confronting the radome, a tether station, a cable connecting the helicopter with the tether station, radar components in the helicopter, radar components associated with the tether station, said components in said helicopter and in said station being interconnected by said cable, adjustable means in the tether station for restraining movement of the cable against lift forces of the helicopter whereby elevation of the helicopter above said tether station may be controlled, and drive means associated with the tether station and connected with the helicopter by said cable for rotating the body about the center section, thereby sweeping the antenna in azimuth.

2. The combination recited in claim 1, including additionally drive means for imparting to the antenna limited movement in azimuth with respect to the helicopter body.

3. The combination recited in claim 1, including means in the tether station for cooling the cable during raising or lowering of the helicopter.

4. A radar system including, in combination, a helicopter comprising a body and a center section, the body being rotatable about the center section, an electric motor in the center section, lift producing blades on the center section, transmission means operatively connecting the motor with the blades, a radome on the body, an antenna in the body confronting the radome, a cable connected with the helicopter, means connected with the cable remote from the helicopter for supplying power to the motor for rotating the blades, and means connected with the cable for rotating the body with respect to the center section whereby the antenna may be caused to sweep in azimuth.

5. A radar system as recited in claim 4, including additionally radar components in the body, and radar components remote from the helicopter, said radar components in the body and those remote therefrom being connected by said cable.

6. A radar system as recited in claim 4, including additionally radar components in the helicopter, radar components remote from the helicopter, and a radio link coupling the separately located radar components, said radio link including an antenna on the helicopter and an antenna remote from the helicopter.

7. A radar system including, in combination, a helicopter comprising a body and a center section, the body being rotatable about the center section, lift producing means secured to said center section, said lift producing means including an electric motor, a radome on the body, an antenna in the body confronting the radome, a tether station, a cable connected with the helicopter and with the tether station, means connected with the cable remote from the helicopter for supplying power to said motor to operate said lift producing means, drive means connected with the cable for rotating the body with respect to the center section whereby the antenna may be caused to sweep in azimuth, and adjustable means in the tether station for restraining movement of the cable against lift forces of the helicopter whereby elevation of the helicopter above said tether station may be controlled.

8. The combination recited in claim 7, including additionally radar components in the helicopter, radar components associated with the tether station, and means operatively connecting said radar components.

9. The combination recited in claim 7, including means in the tether station for cooling the cable during raising or lowering of the helicopter.

10. The combination recited in claim 7, wherein said tether station includes a receptacle to receive the helicopter in lowered position, a shock absorbing means in the receptacle and engaging the helicopter in lowered position, and doors on the receptacle and movable to positions substantially surrounding the helicopter for protecting the same.

References Cited by the Examiner

UNITED STATES PATENTS

| | | | |
|---|---|---|---|
| 1,769,203 | 7/30 | Buckley | 244—14.5 |
| 1,824,910 | 9/31 | MacGregor | 114—20 |
| 2,112,733 | 3/38 | Burnham | 174—15.2 |
| 2,341,923 | 2/44 | Kotelev et al. | 114—16.7 |
| 2,433,344 | 12/47 | Crosby | 343—706 |
| 2,452,726 | 11/48 | Buchet | 244—17.23 |
| 2,519,935 | 8/50 | Smith et al. | 343—6 |
| 2,681,991 | 6/54 | Marco et al. | 343—5 |

OTHER REFERENCES 841,926 6/52 Germany.
16,153 7/08 Great Britain.
496,502 12/38 Great Britain.

CHESTER L. JUSTUS, *Primary Examiner.*

NORMAN H. EVANS, FREDERICK M. STRADER,
*Examiners.*